(12) United States Patent
Faita

(10) Patent No.: US 9,108,165 B2
(45) Date of Patent: Aug. 18, 2015

(54) CELL FOR DEPOLARISED ELECTRODIALYSIS OF SALT SOLUTIONS

(75) Inventor: Giuseppe Faita, Novara (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 88 days.

(21) Appl. No.: 14/002,306

(22) PCT Filed: Mar. 28, 2012

(86) PCT No.: PCT/EP2012/055455
§ 371 (c)(1),
(2), (4) Date: Sep. 18, 2013

(87) PCT Pub. No.: WO2012/130864
PCT Pub. Date: Oct. 4, 2012

(65) Prior Publication Data
US 2015/0041323 A1    Feb. 12, 2015

(30) Foreign Application Priority Data

Mar. 29, 2011   (IT) ................... MI2011A0500

(51) Int. Cl.
| *B01D 61/46* | (2006.01) |
| *B01D 61/52* | (2006.01) |
| *C25B 1/16* | (2006.01) |
| *C25B 1/22* | (2006.01) |
| *C25B 5/00* | (2006.01) |
| *B01D 61/48* | (2006.01) |

(52) U.S. Cl.
CPC ............... *B01D 61/52* (2013.01); *B01D 61/46* (2013.01); *B01D 61/48* (2013.01); *C25B 1/16* (2013.01); *C25B 1/22* (2013.01); *C25B 5/00* (2013.01); *B01D 2313/14* (2013.01)

(58) Field of Classification Search
CPC .... B01D 61/46; B01D 2313/14; B01D 61/52; B01D 61/48; C25B 1/16; C25B 1/22; C25B 5/00
USPC .......................................... 204/522, 529, 633
See application file for complete search history.

(56) References Cited

U.S. PATENT DOCUMENTS 7,993,499 B2 *   8/2011   Zuber et al. .................... 204/252

FOREIGN PATENT DOCUMENTS

| EP | 0522382 | 1/1993 |
| WO | 81/03035 | 10/1981 |
| WO | 03/102271 | 12/2003 |

OTHER PUBLICATIONS

International Search Report issued in counterpart PCT Application No. PCT/EP2012/055455, Nov. 2012.
International Preliminary Report on Patentability in counterpart PCT Application No. PCT/EP2012/055455, Feb. 2013.

* cited by examiner

*Primary Examiner* — Arun S Phasge
(74) *Attorney, Agent, or Firm* — Lucas & Mercanti, LLP

(57) ABSTRACT

The invention relates to a salt solution electrodialysis cell for production of the relevant acids and bases by means of a process with reduced or nil consumption of electrical energy. The cell comprises an anodic chamber fed with hydrogen and a cathodic chamber fed with oxygen or air, provided with the relevant gas-diffusion electrodes; the driving power of the electrodialysis process is given by the oxidation and reduction chemical potentials of hydrogen and oxygen fed to the two chambers.

18 Claims, 1 Drawing Sheet

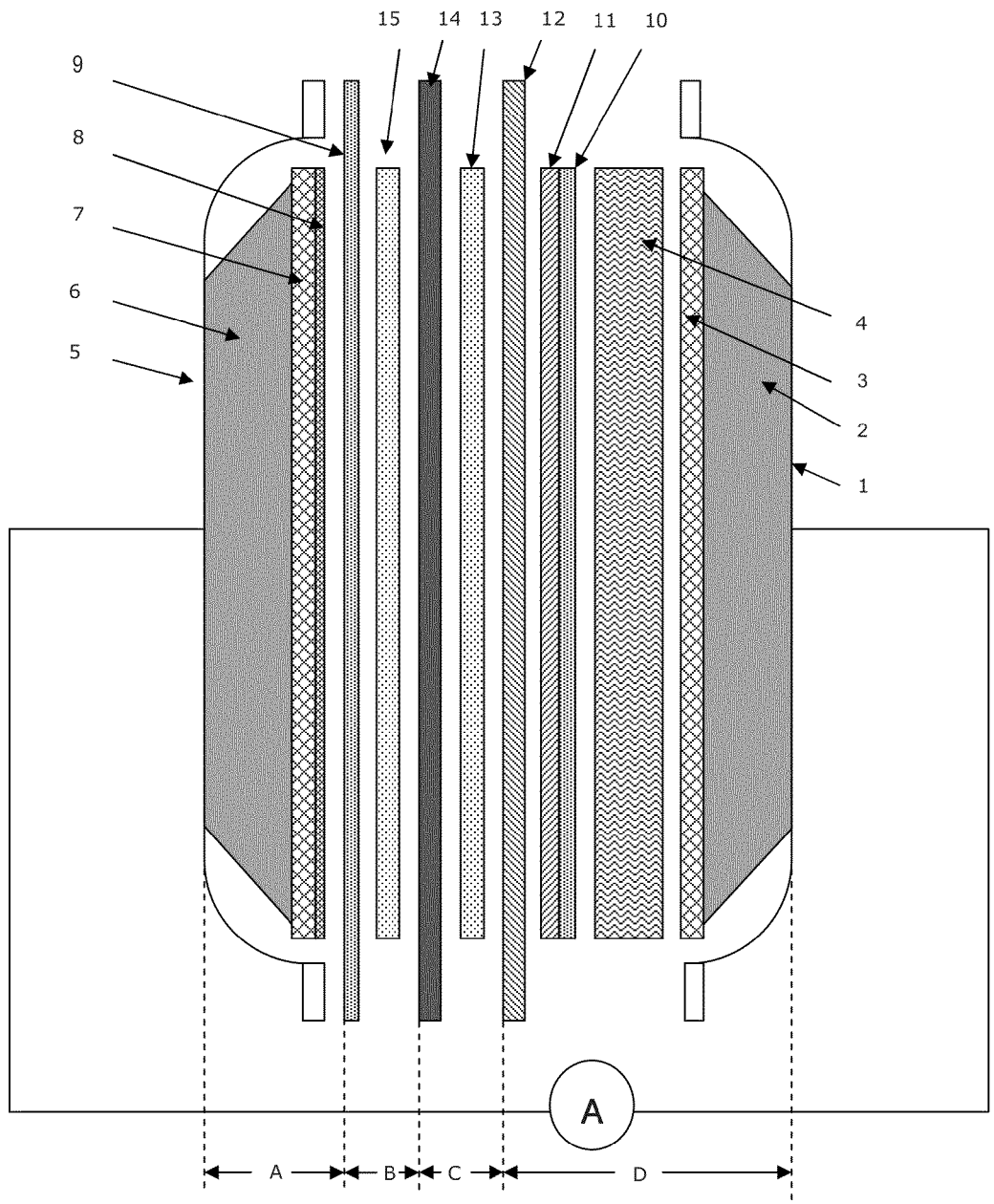

CELL FOR DEPOLARISED ELECTRODIALYSIS OF SALT SOLUTIONS

FIELD OF THE INVENTION

The invention relates to a salt solution electrodialysis cell depolarised by means of gas-diffusion electrodes.

BACKGROUND OF THE INVENTION

The electrodialysis of salt solutions aimed at obtaining the relevant acid and base can be carried out in three compartment electrochemical cells, with a central compartment separated form the anodic compartment and the cathodic compartment by means of two ion-exchange membranes, respectively an anion-exchange membrane and a cation-exchange membrane. The ionic species coming from the dissociation of the salt fed to the central compartment migrate across the respective membrane under the effect of the electric field, bringing about the generation of the relevant acid at the anodic compartment and of the respective base at the cathodic compartment. The anodic compartment is also provided with an anode, on whose surface the evolution of oxygen takes place, while the cathodic compartment is provided with a cathode on which the evolution of hydrogen takes place. One of the possible applications of this technology is for instance the electrodialysis of sodium sulphate solutions with production of sulphuric acid and caustic soda, as an alternative of the most common production of caustic soda by sodium chloride brine electrolysis. This process can be applied for example at caustic-consuming sites having no use for chlorine—which in this case would constitute a by-product difficult to handle and store—or whenever a mutually independent production of chlorine and caustic soda is desirable. The electrical consumption associated with the process is nevertheless very high, due to the voltage associated with the overall net reaction—corresponding to water electrolysis with production of hydrogen and oxygen—and to the high ohmic drop in the various components, with particular reference to the anion-exchange membrane. The problem of the excessive electrical consumption was mitigated in the past by replacing the oxygen-evolving anode with a hydrogen-fed, anodically polarised gas-diffusion electrode: in this way, the overall net reaction has a much lower reversible voltage, corresponding to the potential difference between hydrogen cathodic evolution in alkaline environment and hydrogen anodic consumption in a substantially acidic environment. Also this kind of technology failed to meet however the expected success, on one hand because the various overvoltage components adding up in the process lead in any case to a conspicuous energy consumption, on the other hand because of the difficulty in controlling the process, which is characterised by operative voltage fluctuations even at reduced current density (below 2 kA/m$^2$) associated with the difficulty in humidifying the hydrogen flow fed to the anodic compartment in a regular fashion. An irregular hydrogen humidification may lead to a drying out of the relevant membrane—with consequent rise, sometimes steep, of the operative voltage on account of an ohmic effect—or to a partial flooding of the gas-diffusion electrode, with consequent rise of the operative voltage due to inadequate mass transport of supplied hydrogen. In the most serious cases of flooding, the electric voltage applied at the cell poles may lead to the impossibility of supporting the hydrogen consumption anodic reaction and to the sudden onset of oxygen evolution, with destructive effects for the gas-diffusion electrode which is not specifically designed to resist the oxidising action of nascent oxygen. This situation can moreover lead to the formation of explosive mixtures in the anodic compartment, as it will be evident to a person skilled in the art.

Thus there is a need of providing a new device for the electrodialysis of salt solutions of higher energy efficiency and at the same time easier and safer to operate.

SUMMARY OF THE INVENTION

Various aspects of the invention are set out in the accompanying claims.

In one embodiment, the present invention relates to an electrolytic cell for electrodialysis of salt solutions comprised of three or more chambers, namely one anodic chamber delimited by an external anodic semi-shell and by a gas-diffusion anode fed with a hydrogen-containing fuel gas; at least one intermediate chamber fed with a process electrolyte consisting of a solution containing an acid and/or a salt; one cathodic chamber delimited by an ion-exchange membrane and a cathodic semi-shell, containing a gas-diffusion cathode fed with an oxygen-containing oxidant gas, the two external semi-shells being either mutually short-circuited or connected through an electrical circuit comprising a low power current rectifier. In the latter case, the positive pole of the rectifier is connected to the anodic semi-shell and the negative pole to the cathodic semi-shell. The overall reaction effected by the electrodialysis cell according to the invention is a recombination of hydrogen and oxygen to give water, similarly to what would happen in a fuel cell, with the difference that the electromotive force of the two reactions, anodic and cathodic, is not used to produce electrical energy, but only to accomplish the electrodialysis process. Up to a certain current density (e.g. up to 2 kA/m$^2$) such process may proceed with no external supply of electricity (short-circuited cell), while at higher current density an electrical energy supply is required, although at an extremely lower voltage than what would be required by the cells of the prior art. The inventors observed that with this type of configuration, the cell can be operated in an intrinsically safe way: the possible inefficiencies due to a partial drying out of the membrane or to flooding of gas-diffusion electrodes would in fact lead in this case to temporary phenomena of current density and thus of production decrease, without having the possibility of producing hazardous phenomena of oxygen evolution on the gas-diffusion anode surface, in the absence (or in the presence of a modest amount) of electrical current externally impressed to the cell. The gas-diffusion anode and cathode may consist of a rigid conductive material, for instance a carbon paper or metal mesh, optionally made hydrophobic, for instance by aid of a fluorinated polymer suspension, filled with a composition suitable for favouring the diffusion of the gaseous reactants (for instance a mixture of carbon black or metal powder and of fluorinated polymer binder) and activated on at least one external surface by a catalytic composition, optionally containing a platinum group noble metal.

In one embodiment, the electrodialysis cell comprises a single cation-exchange membrane and a single intermediate chamber delimited by the gas-diffusion anode and the cation-exchange membrane. A solution containing the salt to be processed is optionally fed to the lower part of the chamber, enriched with acid generated by the gas-diffusion anode and extracted from the upper part as acidic solution containing variable amounts of residual salt. Alternatively, the chamber contains a percolator consisting of a porous planar element: in this case, the solution containing the salt is fed to the upper part of the chamber and flows to the lower part, from which it is withdrawn after being enriched with acid generated by the gas-diffusion anode. The percolator allows homogenising the pressure in the liquid column formed by the electrolyte practically cancelling the relevant pressure head, thus eliminating any possibility of flooding of the internal body of the gas-diffusion anode, whose more reliable functioning is thereby ensured. In this embodiment the alkaline solution constituting one of the products is formed by virtue of the combination of cations, migrating from the intermediate chamber across the cation-exchange membrane, and the alkalinity generated by the gas-diffusion cathode, then percolating across the structure of the gas-diffusion cathode or of a hydrophilic layer interposed between membrane and gas-diffusion cathode, to be collected in the lower part of the cathodic chamber from which it is withdrawn.

In one embodiment, the electrodialysis cell of the invention comprises, besides the anodic and cathodic chambers, a single ion-exchange membrane either of anionic or cationic type and two distinct intermediate chambers. A solution containing a diluted base or salt or a mixture thereof can be fed to the lower part of the first intermediate chamber, adjacent to the cathodic chamber and delimited by the gas-diffusion cathode and the ion-exchange membrane; the solution is enriched in alkalinity generated by the gas-diffusion cathode and upon exiting the upper part of the chamber can thus contain variable amounts of salt. Alternatively, the first intermediate chamber is provided with a percolator: in this way, the electrolytic solution is fed to the upper part while the alkali-enriched solution exits from the lower part. The second intermediate chamber, adjacent to the anodic chamber and delimited by the gas-diffusion anode and the ion-exchange membrane, is fed with a process electrolyte consisting of a solution containing an acid and/or a salt which, flowing to the outlet, is enriched with acid generated by the gas-diffusion anode; the acidic solution withdrawn may contain variable amounts of salt. Also in this case, the second intermediate chamber may be fed from the bottom or may be provided with a percolator and fed from the upper part, with the outlet in the lower part.

In one embodiment the electrodialysis cell comprises three distinct intermediate chambers. The first intermediate chamber, adjacent to the cathodic chamber and delimited by the gas-diffusion cathode and by the first ion-exchange membrane is fed, either from the lower part or from the upper part by aid of a percolator, with a solution containing a base and/or a salt, which upon flowing across the chamber is enriched with alkalinity generated by the gas-diffusion cathode: the product alkaline solution taken at the chamber outlet can contain variable amounts of salt. The second intermediate chamber, adjacent to the anodic chamber and delimited by the gas-diffusion anode and by the second ion-exchange membrane, is fed with process electrolyte which, upon flowing to the outlet, is enriched with acid generated by the gas-diffusion anode. The product acidic solution can contain variable amounts of salt. Also the second intermediate chamber may be fed from the bottom or from the top by aid of a percolator. The third intermediate chamber arranged in a central position and delimited by the first and the second ion-exchange membrane, contains a spacer with the purpose of maintaining a preset distance between the two membranes and of ensuring a certain level of turbulence useful to prevent local dilution phenomena. The third intermediate chamber is fed with a salt solution, for instance from the bottom, withdrawing the depleted solution from the upper part of the chamber.

The process electrolyte fed to the cell may contain alkali salts, for instance sulphates, chlorides, carbonates or bicarbonates of sodium or potassium, with the advantage of producing caustic soda or potash on one side, and easily reusable mineral acids such as hydrochloric or sulphuric acid, or carbon dioxide exiting the system in a gaseous form, on the other side.

The fuel gas fed to the anode may consist of a mixture of hydrogen and carbon dioxide coming from a steam reforming or partial oxidation of hydrocarbons or light alcohols. In one embodiment, the oxidant gas fed to the cathode compartment consists of ambient air, which has the advantage of being extremely cheap notwithstanding a certain energy efficiency decrease in the cathodic reaction compared to pure oxygen. In another embodiment, the oxidant gas fed to the cathodic compartment consists of enriched air, for instance air with an oxygen content brought to 50% by means of a known cheap PSA system, which has the advantage of providing a cathodic efficiency very close to that of pure oxygen against a much lower cost. In several chemical plants having cheap hydrogen and/or oxygen available as by-products of other processes, it proves more convenient to operate the electrodialysis with pure reactants rather than with mixtures.

Under another aspect, the invention relates to a process of depolarised electrolysis of salt solutions, carried out in a cell as hereinbefore described, comprising feeding the salt solution to be subjected to electrodialysis, optionally a chloride, sulphate, carbonate or bicarbonate of sodium or potassium, to the inlet of one of the intermediate chambers withdrawing the exhaust solution at the relevant outlet, feeding a hydrogen-containing fuel gas at the anodic chamber inlet and an oxygen-containing oxidant gas to the cathodic chamber inlet, withdrawing the exhausts from the relevant outlets, and electrically connecting the anodic and cathodic semi-shells reciprocally. The semi-shell connection may be either a simple short-circuiting, with optional insertion of an ammeter for keeping the current density under control or of other process instrumentation, or it may include the insertion of a rectifier of small power for supplying a direct current; this can have the advantage of facilitating the process current density adjustment against an energy consumption of small entity.

In one embodiment, the invention relates to a process of depolarised electrolysis of salt solutions carried out in a cell equipped with two intermediate chambers, comprising feeding a process electrolyte, optionally containing sodium or potassium chloride or sulphate, to the inlet of the intermediate chamber adjacent to the cathodic compartment, withdrawing an alkali-enriched exhaust from the relevant outlet; feeding an acidic solution to the inlet of the intermediate chamber adjacent to the anodic compartment, withdrawing an acid-enriched exhaust from the relevant outlet; feeding a hydrogen-containing fuel gas to the anodic chamber inlet and an oxygen-containing oxidant gas to the cathodic chamber inlet, withdrawing the exhausts from the relevant outlets, and electrically connecting the anodic and cathodic semi-shells reciprocally. Also in this case, the semi-shell connection may be either a simple short-circuiting, with optional insertion of an ammeter for keeping the current density under control or of other process instrumentation, or it may include the insertion of a rectifier of small power for supplying a direct current.

BRIEF DESCRIPTION OF THE DRAWING

The drawing shows a schematic cross-section view of a possible embodiment of electrodialysis cell according to the invention of the type comprising two intermediate compartments, before the final tightening.

DETAILED DESCRIPTION OF THE DRAWING

In the drawing there is shown an embodiment of electrodialysis cell delimited by cathodic semi-shell 1 the anodic semi-shell 5, consisting of four chambers, namely cathodic chamber A, first intermediate chamber B adjacent to cathodic chamber A, second intermediate chamber C adjacent to anodic chamber D and anodic chamber D.

Cathodic chamber A is delimited by ion-exchange membrane 12 and cathodic semi-shell 1, and comprises a plurality of elements for transmitting electrical current, in this case in form of strips 2, a foraminous current collector, in this case obtained by superimposing a large mesh expanded sheet 3 to an elastic mat 4, a gas-diffusion cathode 10 and a hydrophilic cloth 11 separating gas-diffusion cathode 10 from ion-exchange membrane 12. Anodic chamber D is in its turn delimited by anodic semi-shell 5 and gas-diffusion anode 9, and comprises a plurality of elements for transmitting electrical current, in this case in form of strips 6, and a foraminous current collector, in this case obtained by superimposing a large mesh expanded sheet 7 and a narrower mesh expanded sheet 8.

First intermediate chamber B is delimited by ion-exchange membranes 12 and 14, which can be respectively a cationic membrane and an anionic membrane, having a spacer 13 arranged therebetween, which may consist of a three-dimensional mesh made of polymer material.

Second intermediate chamber C adjacent to anodic chamber D is delimited by gas-diffusion anode 9 and ion-exchange membrane 14, having a percolator 15 arranged therebetween, which may consist of a three-dimensional mesh made of polymer material.

The two compartments A and D are reciprocally connected in short-circuit through an ammeter.

Some of the most significant results obtained by the inventors are presented in the following examples, which are not intended as a limitation of the domain of the invention.

Example 1

An experimental cell was assembled according to the scheme shown in the FIGURE. The cell was comprised of cathodic semi-shell 1 made of AISI 310 stainless steel, on which wall strips 2 were secured: in its turn, on strips 2 a current collector 3 was secured, made of 1 mm-thick expanded sheet with rhomboidal openings having diagonals of 5 and 10 mm. Strips 2 and current collector 3 were also made of AISI 310 stainless steel. The current collector was put in contact with an elastic mat 4 formed by an assembly of nickel wire coils of 0.3 mm diameter, contacting in its turn an assembly consisting of a gas-diffusion cathode (GDC) 10 and a porous hydrophilic layer 11. The GDC was made of graphitised carbon paper, wet-proofed by soaking in a polytetrafluoroethylene suspension followed by a sintering thermal treatment carried out at 350° C.: on the carbon paper surface opposite the one contacting mat 4 a catalytic film had been previously applied, consisting of a mixture of particles of PTFE and of platinum supported on high specific surface carbon (60% platinum on Vulcan XC-72 carbon/Cabot Corporation). The catalysed surface of the GDC was 20×20 cm$^2$. Current collector 3 and mat 4 were both coated with a 5 μm thick silver film directed to minimise contact electrical resistance.

The wall of semi-shell 1 and cation-exchange membrane 12 (Neosepta CM-2/Astom Corp.) delimited a cathodic chamber A fed with pure oxygen. In a different test, oxygen was replaced with enriched air containing 60% oxygen.

Titanium anodic semi-shell 5 was equipped with titanium strips 6 whereupon a current collector was secured, consisting of a first 1 mm-thick titanium expanded sheet 7 with rhomboidal openings having diagonals of 5 and 10 mm and a second 0.5 mm-thick expanded sheet 8 made of titanium containing 0.2% palladium, with rhomboidal openings having diagonals of 3 and 5 mm. The current collector was kept in contact with gas-diffusion anode (GDA) 9 made of graphitised carbon paper, wet-proofed by soaking in a polytetrafluoroethylene suspension followed by a sintering thermal treatment carried out at 350° C. The wall of semi-shell 5 and the GDA delimited an anodic chamber D fed with pure hydrogen.

On the carbon paper surface opposite the one contacting sheet 8 a catalytic film had been previously applied, consisting of a mixture of particles of PTFE and of platinum supported on high specific surface carbon (60% platinum on Vulcan XC-72 carbon/Cabot Corporation). To minimise contact electrical resistance between sheet 8 and GDA, a 0.2 μm-thick platinum film was applied on sheet 8 by electroplating.

The catalysed surface of the GDA was 20×20 cm$^2$ and it was kept in contact with a first 1 mm-thick polyethylene mesh 15, in contact in its turn with an anion-exchange membrane 14 (Neosepta AMX/Astom Corp.): mesh 15 had the purpose of ensuring a preset and uniform gap between GDA and membrane 14, whose surfaces delimited intermediate chamber C (second intermediate chamber above) crossed by a hydrochloric acid solution of concentration adjusted during the testing phase between 1 and 5%.

In a different test, intermediate chamber C was fed with a solution containing sodium chloride at concentration varying between 100 and 200 g/l.

Membrane 14 was kept in contact with a second polyethylene mesh 13 also 1 mm-thick, contacting in its turn cation-exchange membrane 12: intermediate chamber B (first intermediate chamber above) delimited by two membranes 12 and 14 was fed from bottom to top with a sodium chloride solution whose concentration varied during the test between 100 and 200 g/l. The sodium chloride solution was recycled through a collection vessel. In another test the sodium chloride solution was not recycled but fed to intermediate chamber C where a mixture with hydrochloric acid was generated.

The cell was assembled by tightening with suitable tie-rods semi-shells 1 and 10 with elements 4, 10, 11, 12, 13, 14, 15 and 9 interposed together with the relevant peripheral gaskets (not shown) required for preventing the various fluids from leaking to the external environment. Upon tightening the two semi-shells, elastic mat 4 was compressed, ensuring an adequate contact pressure between the various parts of the assembly.

The cell chambers were then connected to the relevant feeding and extraction circuits, in particular:
  cathodic chamber A with feeding circuits of pure oxygen or enriched air and extraction circuits of exhaust oxidant gas. A discharge pipe from which caustic soda percolating through hydrophilic porous layer 11 was extracted was connected to the lower part of the chamber. Caustic soda concentration was adjusted between 10 and 20% by varying the concentration of sodium chloride solution fed to intermediate chamber B between 100 and 200 g/l;
  intermediate chamber B with feeding circuits (lower part) of 100-200 g/l sodium chloride and extraction circuits (upper part) of depleted sodium chloride;
  intermediate chamber C with feeding circuits (lower part) of diluted hydrochloric acid and d extraction circuits (upper part) of product hydrochloric acid (1-5%);
  anodic chamber D with feeding circuits of hydrogen used as reactant and extraction circuits of exhaust hydrogen.

The cell, thermostated at 70° C. by controlling the temperature of solutions fed to intermediate chambers B and C, had an open circuit voltage of 0.4 V. After short-circuiting semi-shells 1 and 10 the circulating current, as measured by an ammeter inserted in the electrical circuit, was stabilised at 80 A, corresponding to a current density of 2 kA/m$^2$ with a pure oxygen feed, and at 68 A, corresponding to a current density of 1.7 kA/m$^2$ with an enriched air feed containing 60% oxygen, both being values suitable for industrial applications. At a sodium chloride concentration of 100 g/l of solution fed to intermediate chamber B, caustic soda had a concentration of 15-17%. The yield of production of hydrochloric acid and caustic soda was about 85%.

In a subsequent test, sodium chloride solution taken at the outlet of intermediate chamber B was used as feed of intermediate chamber C. The product at the outlet of intermediate chamber C contained in this case 1-5% hydrochloric acid and 100-200 g/l sodium chloride.

Example 2

The same cell of Example 1 was used, only replacing anion-exchange membrane 14 with a cation-exchange membrane (Neosepta CM-2): in this case an excessive fraction of acid produced in intermediate chamber C migrated across such membrane to intermediate chamber B. It was observed that a major part of this loss was recovered when sodium chloride solution exiting intermediate chamber B was sent to the inlet of intermediate chamber C, rather than being recycled: in this way, in fact, the amount of hydrochloric acid effectively lost was limited to the fraction migrating across membrane 12. This fraction turned out to be surprisingly small: the favourable effect was attributed to the action of sodium ions formed by sodium chloride dissociation, which significantly reduced the transport number of acidity. In particular, a short-circuit current of 84 A was obtained, corresponding to a current density of 2.1 kA/m$^2$, and a yield of production of acid and caustic soda of about 80%.

Example 3

The cell of Example 1 was modified by replacing hydrophilic porous layer 11 with a 0.5 mm-thick polyethylene mesh equivalent to meshes 13 and 15. Moreover the hydrochloric acid diluted solution was fed to the upper part of intermediate chamber C and percolated down to the outlet positioned in the lower part. In a totally similar fashion the mesh installed in replacement of hydrophilic porous layer 11 was fed from the upper part with a solution of diluted caustic soda which was enriched upon percolating to the lower part from which it was extracted. This type of feeding was tested as it remarkably reduces the pressure head applied to GDA and GDC making the construction of industrial cells with a vertical height above 1 meter feasible. The cell structure of Examples 1 and 2 on the contrary subjects GDA and GDC to a higher pressure head corresponding to the net hydraulic head to which dynamic effects associated with the flow solution exiting intermediate chambers B and C adds up. This situation limits the maximum cell height to about 50-70 cm otherwise the internal structure of gas-diffusion electrodes is flooded with consequent loss of performance. The short-circuit current was 75 A, corresponding to a current density of about 1.9 kA/m$^2$.

Example 4

The test of Example 1 was duplicated after simplifying the cell structure by eliminating membrane 14 and mesh 13, operating with a single intermediate chamber delimited by GDA 9 and membrane 12. In this case a yield of production of acid and of caustic soda of about 75% was obtained, still considered acceptable for industrial applications, provided the remaining intermediate chamber is fed with a single pass of sodium chloride solution of concentration above 200 g/l at neutral pH. The short-circuit current was 92 A, corresponding to a current density of 2.3 kA/m$^2$.

Example 5

The test of Example 1 was duplicated making use of a sodium sulphate solution with production of 10% sulphuric acid and 15% caustic soda. The results obtained, in terms of production yield and short-circuit current, were substantially equivalent to those described for the production of hydrochloric acid and of caustic soda from sodium chloride solutions.

The previous description shall not be intended as limiting the invention, which may be used according to different embodiments without departing from the scopes thereof, and whose extent is univocally defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

I claim:

1. Electrolytic cell for electrodialysis of salt solutions delimited by an anodic semi-shell and a cathodic semi-shell, comprising:
    one anodic chamber delimited by said anodic semi-shell and by a gas-diffusion anode fed with a hydrogen-containing fuel gas;
    at least one intermediate chamber fed with a process electrolyte consisting of a solution containing an acid and/or a salt, said at least one intermediate chamber delimited by said gas-diffusion anode and by an ion-exchange membrane;
    one cathodic chamber delimited by said ion-exchange membrane and said cathodic semi-shell, containing a gas-diffusion cathode fed with a oxygen-containing oxidant gas;
    the anodic semi-shell and the cathodic semi-shell being either mutually short-circuited or connected through a current rectifier with the positive pole connected to the anodic semi-shell and the negative pole connected to the cathodic semi-shell.

2. The cell according to claim 1 wherein said at least one intermediate chamber comprises a percolator suitable to be fed from the top with said process electrolyte, interposed between said gas-diffusion anode and said ion-exchange membrane.

3. The cell according to claim 1 comprising two intermediate chambers, namely a first intermediate chamber fed with a salt solution and delimited by said first ion-exchange membrane and said second ion-exchange membrane and a second intermediate chamber fed with said process electrolyte consisting of a solution containing an acid and/or a salt and delimited by said second ion-exchange membrane and said gas-diffusion anode.

4. The cell according to claim 3 wherein said second intermediate chamber comprises a first percolator suitable to be fed from the top with said process electrolyte consisting of a solution containing an acid and/or a salt, said first percolator being interposed between said gas-diffusion anode and said second ion-exchange membrane.

5. The cell according to claim 3 wherein the feed of said second intermediate chamber is connected to the outlet of said first intermediate chamber.

6. The cell according to claim 3 wherein said first intermediate chamber contains a spacer.

7. The cell according to claim 3 wherein said first ion-exchange membrane is a cationic membrane and said second ion-exchange membrane is an anionic membrane.

8. Process of electrodialysis of a salt solution in a cell according to claim 3, comprising the following simultaneous or sequential steps:
    feeding the process electrolyte to one or more intermediate chamber and withdrawing an alkali-containing exhaust at the respective outlet;
    feeding an acid solution at the inlet of said second intermediate chamber and withdrawing an acid-enriched exhaust at the respective outlet;
    feeding a hydrogen-containing fuel gas at the inlet of the anodic chamber and withdrawing hydrogen-depleted fuel gas at the respective outlet;
    feeding an oxygen-containing oxidant gas at the inlet of the cathodic chamber and withdrawing oxygen-depleted oxidant gas at the respective outlet;
    electrically connecting the anodic and cathodic semi-shells, optionally feeding a direct electric current through said rectifier.

9. The process according to claim 8 wherein said process electrolyte and said acid solution fed to said second intermediate chamber contain the same anion, optionally chloride or sulphate.

10. The cell according to claim 1 wherein said cathodic chamber contains the alkaline solution generated by the gas-diffusion cathode.

11. The cell according to claim 1 comprising three intermediate chambers, namely a first intermediate chamber fed with a solution containing a base and/or a salt and delimited by said ion-exchange membrane and by said gas-diffusion cathode, a second intermediate chamber fed with said process electrolyte consisting of a solution containing an acid and/or a salt and delimited by a second ion-exchange membrane and by said gas-diffusion anode and a third intermediate chamber fed with a salt solution.

12. The cell according to claim 11 wherein said first intermediate chamber comprises a percolator suitable to be fed from the top with said solution containing a base and/or a salt.

13. The cell according to claim 11 wherein said third intermediate chamber contains a spacer.

14. The cell according to claim 11 wherein said solution containing an acid and/or a salt contains an alkali chloride, sulphate, carbonate or bicarbonate.

15. The cell according to claim 11 wherein said solution containing an acid and/or a salt contains hydrochloric or sulphuric acid.

16. The cell according to claim 1 wherein said external electrical connection is an electrical circuit comprising a current rectifier having the positive pole connected to said anodic semi-shell and the negative pole connected to said cathodic semi-shell.

17. Process of electrodialysis of a salt solution in a cell according to claim 1, comprising the following simultaneous or sequential steps:
    feeding the process electrolyte at the inlet of at least one of said intermediate chambers and withdrawing the relevant exhaust at the respective outlet;
    feeding a hydrogen-containing fuel gas at the inlet of the anodic chamber and withdrawing hydrogen-depleted fuel gas at the respective outlet;
    feeding an oxygen-containing oxidant gas at the inlet of the cathodic chamber and withdrawing oxygen-depleted oxidant gas at the respective outlet;
    electrically connecting the anodic and cathodic semi-shells, optionally feeding a direct electric current through said rectifier.

18. The process according to claim 17 wherein said process electrolyte contains an alkali chloride, sulphate, carbonate or bicarbonate.

* * * * *